(12) United States Patent
Nishida et al.

(10) Patent No.: US 8,040,441 B2
(45) Date of Patent: Oct. 18, 2011

(54) PROJECTOR AND ADJUSTMENT METHOD OF THE SAME

(75) Inventors: Koji Nishida, Tokyo (JP); Mitsuyasu Asano, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1016 days.

(21) Appl. No.: 11/934,837

(22) Filed: Nov. 5, 2007

(65) Prior Publication Data
US 2008/0136975 A1    Jun. 12, 2008

(30) Foreign Application Priority Data
Dec. 6, 2006  (JP) ................ P2006-328926

(51) Int. Cl.
*H04N 3/22* (2006.01)
*H04N 3/26* (2006.01)
(52) U.S. Cl. ........................... 348/745; 348/744
(58) Field of Classification Search .......... 348/189–190, 348/744–745; 345/88; 353/31, 69
See application file for complete search history.

(56) References Cited

U.S. PATENT DOCUMENTS

| 5,475,447 A | 12/1995 | Funado | |
| 5,883,476 A * | 3/1999 | Noguchi et al. | 315/368.12 |
| 6,333,768 B1 * | 12/2001 | Kawashima et al. | 348/806 |
| 6,369,863 B1 | 4/2002 | Smith | |
| 6,707,509 B2 * | 3/2004 | Chauvin et al. | 348/745 |

FOREIGN PATENT DOCUMENTS

| JP | 05-236516 | 9/1993 |
| JP | 07-287204 | 10/1995 |
| JP | 2004-229195 | 8/2004 |
| JP | 2005-033271 | 2/2005 |

* cited by examiner

*Primary Examiner* — Ngoc Vu
(74) *Attorney, Agent, or Firm* — Finnegan, Henderson, Farabow, Garrett & Dunner, L.L.P.

(57) ABSTRACT

A display apparatus for displaying color images on a screen by projecting each-color image beams modulated with a display device includes a memory storing correction data exhibiting a registration deviation amount on the screen; a displacement calculating unit calculating the registration deviation amount every one pixel of at least one-color signal based on the correction data stored in the memory; a correcting unit correcting the signal level of the one-color signal so that the signal level becomes in proportion to a brightness level on the screen; and a registration deviation correcting unit correcting the registration deviation of the one-color signal every one pixel by interpolation arithmetic processing of the color signal corrected with the correcting unit based on the registration deviation amount calculated with the displacement calculating unit, wherein the display device of the corresponding color is driven by the color signal corrected with the registration deviation correcting unit.

10 Claims, 4 Drawing Sheets

PROJECTOR AND ADJUSTMENT METHOD OF THE SAME

CROSS REFERENCES TO RELATED APPLICATIONS

The present invention contains subject matter related to Japanese Patent Application JP 2006-328926 filed in the Japanese Patent Office on Dec. 6, 2006, the entire contents of which are incorporated herein by reference.

BACKGROUND OF THE INVENTION

1. Field of the Invention

The present invention relates to a projector and an adjustment method of the projector that may incorporate a three-panel projector. According to an embodiment of the present invention, the registration deviation is corrected by interpolation arithmetic processing after the signal level of a color signal is corrected so that the signal level is in proportion to the brightness level displayed on a screen, so that the registration deviation can be simply corrected with high accuracies so as to reduce the deterioration in image quality in comparison with the past.

2. Description of the Related Art

In production lines of the three-panel projector, the alignment of an optical system and a liquid crystal display panel has been mechanically adjusted for registration. Namely, as shown FIG. 4, a three-panel projector 1 drives transmission liquid crystal display panels 2R, 2G, and 2B for red, green, and blue with three-color signals, respectively, as well as it divides an illumination beam emitted from a predetermined light source into three-color illumination beams with an optical system such as a dichroic prism. The three-panel projector 1 admits the three-color illumination beams onto the transmission liquid crystal display panels 2R, 2G, and 2B and modulates them so as to produce three-color image beams LR, LG, and LB, respectively. The three-panel projector 1 projects the image beams LR, LG, and LB onto a screen 3 via a predetermined optical system so as to display color images on the screen 3.

Figure 4:
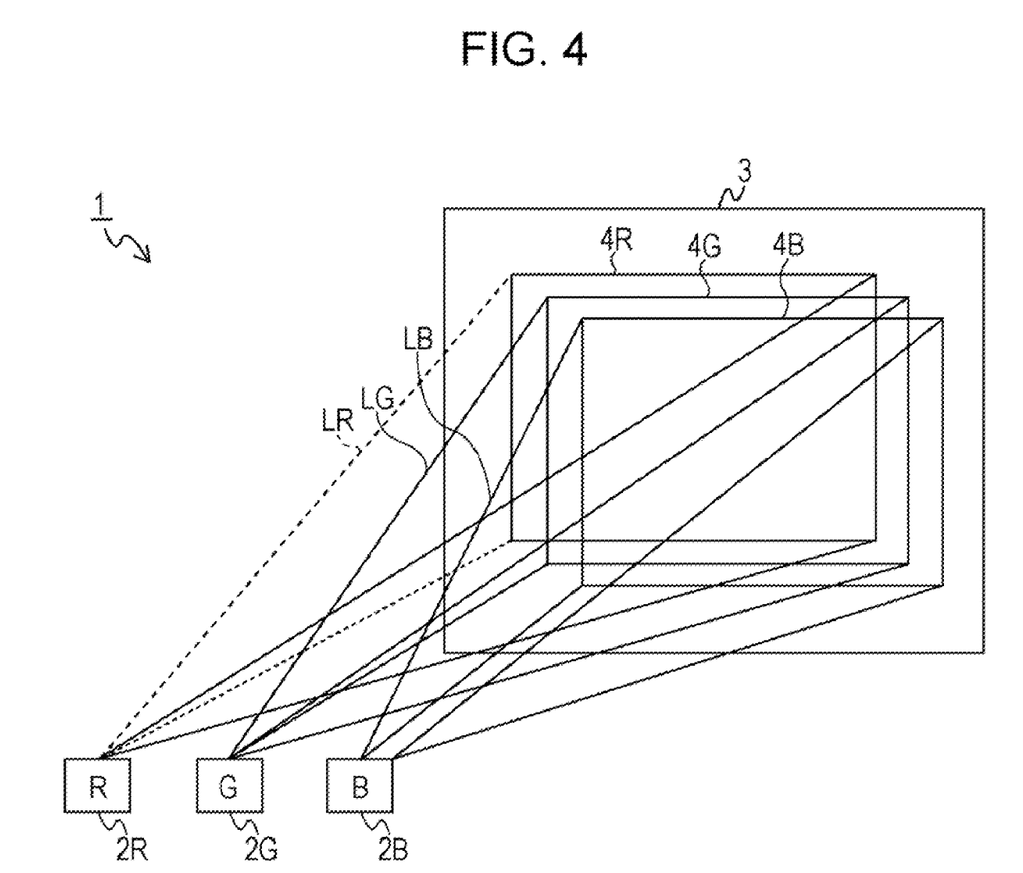
FIG. 4 is a schematic diagram for illustrating the registration adjustment in a conventional projector.

Thus, on the screen 3 of the three-panel projector 1, if the three-color images 4R, 4G, and 4B due to the respective image beams LR, LG, and LB are not precisely overlapped with each other and displayed, the registration deviation would be generated. Then, in the production lines, the transmission liquid crystal display panels 2R, 2G, and 2B are fixed with an adhesive for preventing the registration deviation after their alignment is mechanically adjusted to correct the registration deviation.

Referring to FIG. 4, if the blue-image 4B is deviated in registration relative to the green-image 4G in the horizontal or vertical direction, for example, the mounting position of the transmission liquid crystal display panel 2B is displaced by the angle corresponding to its registration deviation in the horizontal or vertical direction so as to correct the registration deviation. Alternatively, if the blue-image 4B is obliquely inclined to deviate relative to the green-image 4G, the mounting position of the transmission liquid crystal display panel 2B is rotated by its registration deviation so as to correct the registration deviation.

As for such registration, a method for preventing the registration deviation due to mechanical impact is proposed in Japanese Unexamined Patent Application Publication No. H07-287204. An electrical registration adjusting method is also proposed in Japanese Unexamined Patent Application Publication No. 2004-229195, in which a display device is driven via a memory and the address written on the memory is controlled. Also, a measuring method of the convergence that is the registration in a cathode ray tube device is proposed in Japanese Unexamined Patent Application Publication No. R05-236516.

When the registration is adjusted by mechanically aligning the mounting positions of the optical system and the liquid crystal display panel, the work may require a time and the deviation cannot be perfectly corrected.

A method for solving the problems may include the technique disclosed in Japanese Unexamined Patent Application Publication No. 2004-229195; however, in this method, the registration deviation can be corrected only in one-pixel units and also only in the horizontal or vertical direction.

SUMMARY OF THE INVENTION

The present invention has been made in view of the problems described above and it is desirable to propose a projector and an adjustment method of the projector capable of simply correcting the registration deviation with high accuracies so as to reduce the deterioration in image quality in comparison with the past.

In a display apparatus according to an embodiment of the present invention for displaying color images on a screen by projecting each-color image beams modulated from illumination light of the corresponding color with a display device driven by a predetermined color signal, the display apparatus includes a memory configured to store correction data exhibiting a registration deviation amount on the screen; a displacement calculating unit configured to calculate the registration deviation amount every one pixel of at least one of the color signal based on the correction data stored in the memory; a correcting unit configured to correct the signal level of the one-color signal so that the signal level becomes in proportion to a brightness level on the screen; and a registration deviation correcting unit configured to correct the registration deviation of the one-color signal every one pixel by interpolation arithmetic processing of the color signal corrected with the correcting unit based on the registration deviation amount calculated with the displacement calculating unit, in which the display device of the corresponding color is driven by the color signal corrected with the registration deviation correcting unit.

In an adjustment method of a display apparatus according to another embodiment of the present invention for displaying color images on a screen by projecting each-color image beams modulated from illumination light of the corresponding color with a display device driven by a predetermined color signal, the adjustment method includes the steps of displacement-calculating a registration deviation amount every one pixel of at least one of the color signal based on correction data stored in a memory; correcting a signal level of the one-color signal so that the signal level becomes in proportion to a brightness level on the screen; registration-deviation correcting the registration deviation of the one-color signal every one pixel by interpolation arithmetic processing of the color signal corrected by the correcting step based on the registration deviation amount calculated by the displacement-calculating step; and driving the corresponding display device with the color signal corrected by the registration-deviation correcting step.

According to the embodiments, after the signal level of the color signal is corrected so that the signal level becomes in proportion to the brightness level displayed on the screen, the registration deviation can be electrically corrected by the interpolation arithmetic processing with an accuracy of one pixel or less. Thereby, the image quality degradation due to the changes of balances in brightness and color is reduced, so that the registration deviation can be more simply corrected with higher accuracies in comparison with the past.

According to the embodiments of the present invention, while the image quality degradation is being reduced, the registration deviation can be more simply corrected with higher accuracies in comparison with the past.

DESCRIPTION OF THE PREFERRED EMBODIMENTS

Embodiments of the present invention will be described in detail below with reference to the suitable drawings.

First Embodiment (1) Configurations of the Embodiment

Figure 2:
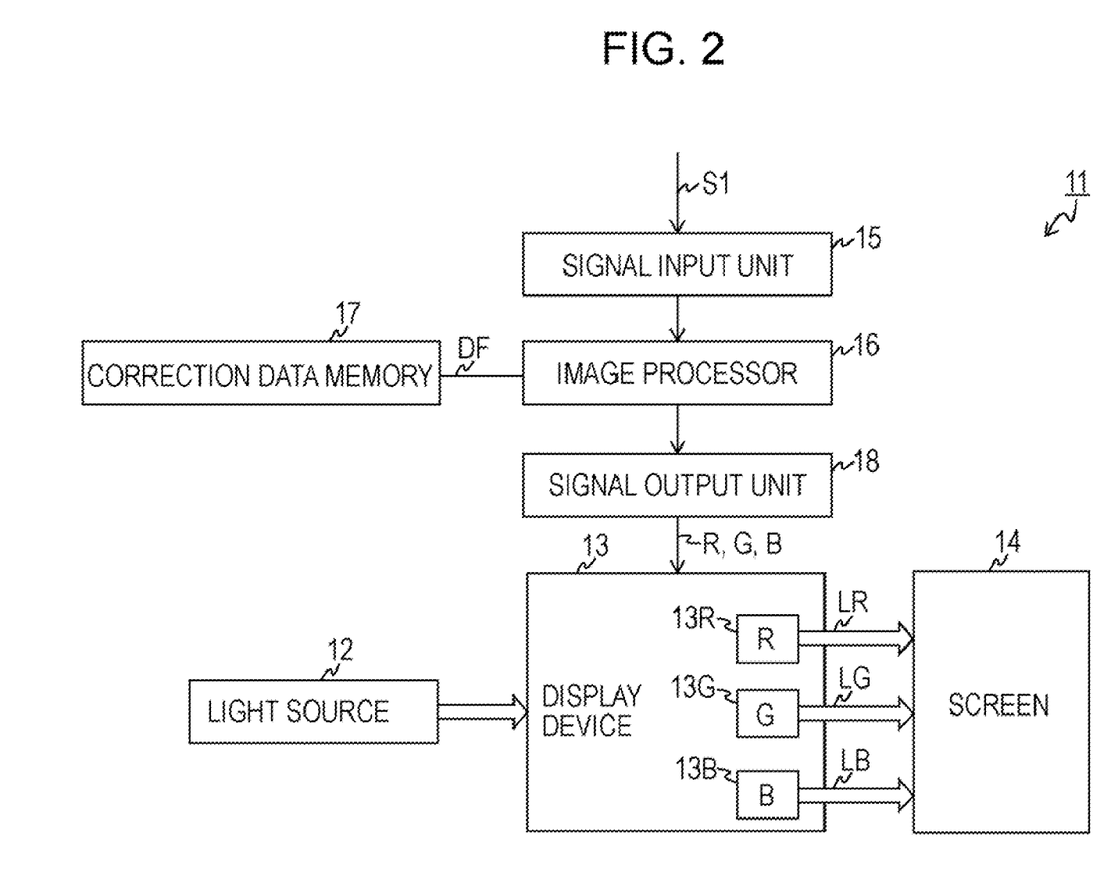
FIG. 2 is a block diagram showing the projector according to the first embodiment of the present invention.

FIG. 2 is a block diagram of a projector according to a first embodiment of the present invention. The projector 11 is a three-panel rear projector and it divides an illumination beam emitted from a light source 12 into R, G, and B color illumination beams with an optical system, such as a dichroic prism (not shown), so as to admit them in a display device 13. The display device 13 is transmission liquid crystal display panels 13R, 13G, and 13B corresponding to R, G, and B color, and it modulates the incident R, G, and B color illumination bears so as to produce R, G, and B color image beams LR, LG, and LB. The display device 13 may widely include various display devices applicable in the projector, such as a digital micromirror device (DMD). The projector 11 projects the R, G, and B color image beams LR, LG, and LB on a screen 14 with a predetermined optical system so as to display color images on the screen 14.

In the projector 11, a signal input unit 15 inputs a video signal S1 thereinto from image instruments such as a television tuner and a video tape recorder. An image processor 16 corrects the registration deviation of the video signal entered from the signal input unit 15 based on correction data DF stored in a correction data memory 17 as a reference so as to output red, green, and blue color signals R, G, and B. A signal output unit 18 drives the transmission liquid crystal display panels 13R, 13G, and 13B with the red, green, and blue color signals R, G, and B outputted from the image processor 16, respectively. Thereby, the projector 11 displays the color images of the video signal S1 entered in the signal input unit 15 on the screen 14.

Figure 3:
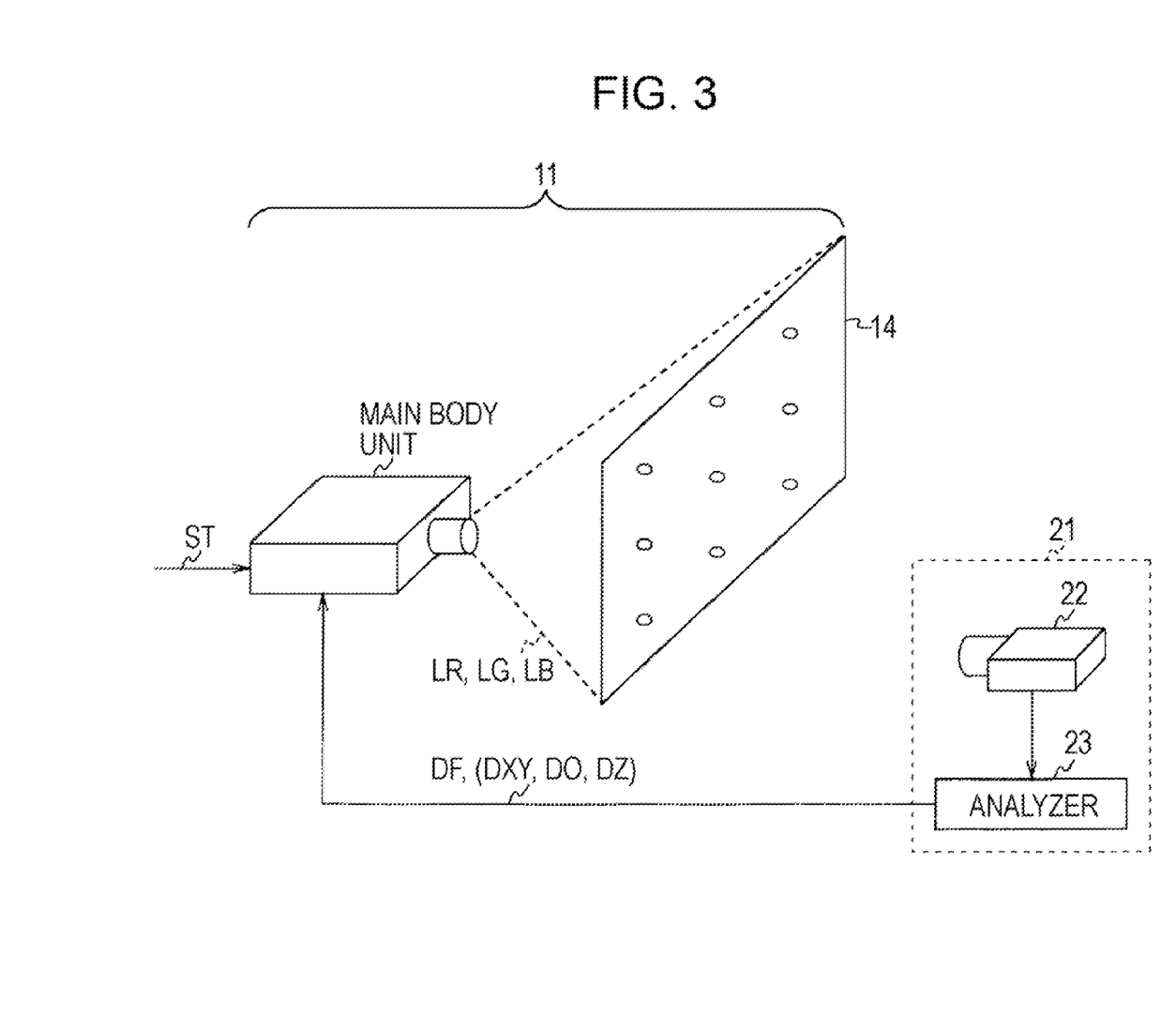
FIG. 3 is a schematic diagram for illustrating correction data in the projector shown in FIG. 2.

In the correction data memory 17, the correction data DF is stored before factory shipping for correcting the registration deviation. That is, as shown in FIG. 3, after the mounting positions of the transmission liquid crystal display panels 13R, 13G, and 13B and the position of the optical system are roughly adjusted and fixed with an adhesive, a predetermined test signal ST is entered in the projector 11 so as to display the images of the test signal ST on the screen 14. The test signal ST is herein a video signal of a dot pattern, for example.

The projector 11 picks up the display on the screen 14 with a registration measuring device 21 so that the correction data DF is stored in the correction data memory 17 by the registration measuring device 21 based on the imaging results. Namely, the registration measuring device 21 picks up the display on the screen 14 with an image pickup device 22 so as to detect a registration deviation amount by analyzing the imaging results with an analyzer 23.

According to the embodiment, the analyzer 23 detects registration deviation amounts of red and blue color images relative to green color images based on the projected images formed on the screen 14 corresponding to the green color images. Namely, the analyzer 23 detects the display position of each dot of red, green, and blue colors. The analyzer 23 detects the angle defined by a straight line connecting optional two dots of red color and a straight line connecting corresponding two green dots. The analyzer 23 repeats the angle detecting processing at a plurality of positions on the screen so as to obtain the average value from these results so that the rotational registration deviation amount Dθ that can be corrected by rotating the red color images about the green color images is detected with the average angle of rotation. Similarly, the rotational registration-deviation amount Dθ that can be corrected by rotating the blue color images about the green color images is detected with the angle of rotation. The analyzer 23 detects the length ratio of a straight line connecting optional two dots of red color to a straight line connecting corresponding two green dots. The analyzer 23 repeats the ratio detecting processing at a plurality of positions on the screen so as to obtain the average value from these results so that the projection-magnification registration-deviation amount DZ that can be corrected by changing the projection magnification of red-color images relative to green-color images is detected with the magnification to the green-color images. Similarly, the projection-magnification registration-deviation amount DZ that can be corrected by changing the projection magnification of blue-color images relative to green-color images is detected with the magnification to the green-color images. The registration-deviation amount that can be corrected by changing the projection magnification is herein the registration-deviation amount due to lateral chromatic aberration. After the display positions of the red-color dot and the blue-color dot are corrected with the rotational registration-deviation amount Dθ and the projection-magnification registration-deviation amount DZ, the registration deviation amounts of the red-color dot and the blue-color dot relative to the green-color dot are averaged every red-color and blue-color so as to detect the parallel-displacement registration deviation amount DXY that can be corrected by moving red and blue color images in parallel.

The analyzer 23 records the parallel-displacement registration deviation amount DXY, the rotational registration-deviation amount Dθ, and the projection-magnification registration-deviation amount DZ on the correction data memory 17. The parallel-displacement registration deviation amount DXY, the rotational registration-deviation amount Dθ, and the projection-magnification registration-deviation amount DZ may also be detected only at a predetermined position on the screen 14 established in advance. In the state of correction data DF stored in the correction data memory 17 with no value corrected in registration-deviation, the analyzer 23 detects the parallel-displacement registration deviation amount DXY, the rotational registration-deviation amount D θ, and the projection-magnification registration-deviation amount DZ so as to record them on the correction data memory 17.

Figure 1:
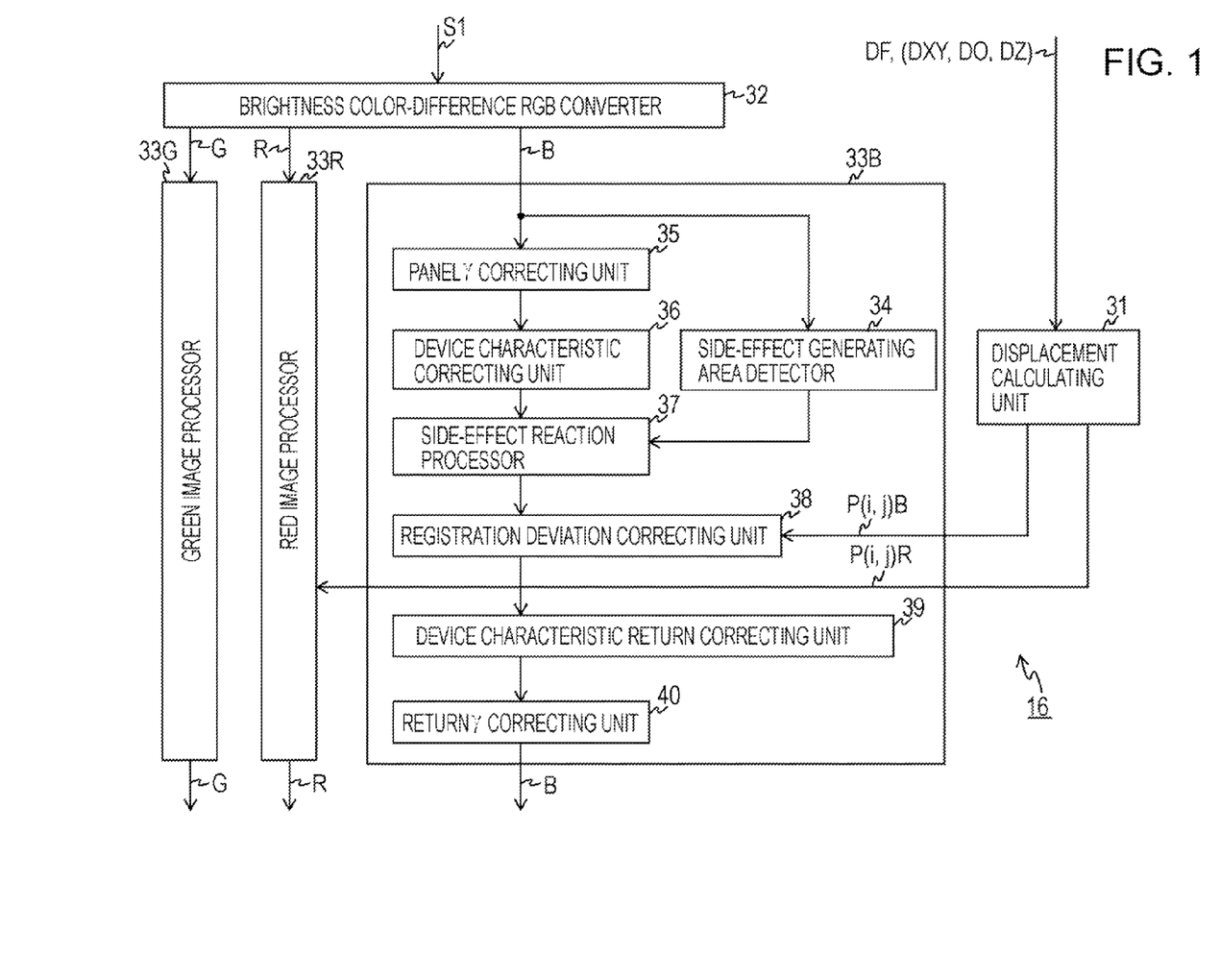
FIG. 1 is a block diagram of image processing by a projector according to a first embodiment of the present invention.

FIG. 1 is a block diagram of detailed configurations of the image processor 16. In the image processor 16, a displacement calculating unit 31 calculates registration-deviation amounts of red-color and blue-color pixels relative to a green-color pixel based on the correction data DF stored in the correction data memory 17.

When the registration deviation is only due to the parallel displacement of each-color images, if the parallel-displacement registration deviation amount DXY is established in the displacement registration deviation amount of each pixel, the registration deviation amount of each pixel can be obtained. That is, in this case, if the parallel-displacement registration deviation amount DXY is to be (sx, sy), the pixel parallel-displacement registration deviation amount PXY at the point (i, j) is expressed as PXY (i, j)=(sx, sy). In this case, positions of green-color and red-color (blue-color) dots are measured at optional points on the screen so as to calculate the difference therebetween. The positions are measured at several points and the results are averaged so as to have the parallel displacement sx, sy.

When the registration deviation is only due to the rotation of each-color images, the registration deviation amount of each pixel Pθ (i, j) can be obtained by the arithmetic processing of the following equation. The point (p, q) is the rotational center of each of the images; in equation (1), the distance between the rotational center and the pixel at the point (i, j) is expressed by the number of pixels; and θ is the rotational angle due to the rotational registration deviation amount Dθ. In this case, the coordinate where red (blue)-color and green-color dots are overlapped with each other is detected so as to measure the rotational angle θ after detecting the rotational center (p, q).

[Numerical Formula 1]

$$P_\theta(i,j)=((i-p)\cos\theta-(j-q)\sin\theta+p-i, (i-p)\sin\theta+(j-q)\cos\theta+q-j) \quad (1)$$

When the registration deviation is only due to the projection magnification of each-color images, the registration deviation amount of each pixel PZ (i,j) can be obtained by the arithmetic processing of the following equation. Character m herein denotes the magnification due to the projection-magnification registration-deviation amount DZ; the point (p, q) in the equation (2) is the center of enlarging/contracting of images. In this case, the magnifications mx and my in the horizontal and vertical directions are respectively determined to be the projection-magnification registration-deviation amount DZ so that the registration deviation amount PZ (i, j) due to the projection magnifications in the horizontal and vertical directions may also be calculated with the magnifications mx and my in the horizontal and vertical directions as shown in the equation (3). In this case, the coordinate where red (blue)-color and green-color dots are overlapped with each other is detected so as to measure the magnification m (mx, my) after detecting the rotational center (u, v).

[Numerical Formula 2]

$$P_z(i,j)=(m(i-u)+u-i, m(j-v)+v-j) \quad (2)$$

[Numerical Formula 3]

$$P_z(i,j)=(mx(i-u)+u-i, my(j-v)+v-j) \quad (3)$$

Whereas, when the registration deviation is due to the parallel displacement and the rotation of each-color images, the registration deviation amount of each pixel Pθ (i, j) can be obtained by the arithmetic processing of the following equation. In this case, first, the positions of green-color and red-color (blue-color) dots are measured at optional two points so as to detect the angle defined by the straight line connecting the two points due to the green-color dot and the straight due to the red-color dot. The positions are measured at several points and the results are averaged so as to have the rotational angle θ. Then, at optional points, the positions of green-color and red-color (blue-color) dots are measured so as to calculate the coordinate R (i, j) of the position where the coordinate of red-color (blue-color) dot is rotated by the rotational angle θ. The rotated coordinate R (i, j) is expressed by (i cos θ−j sin θ, i sin θ+j cos θ). Furthermore, the difference between the rotated coordinate and the coordinate of the green-color dot is calculated. The differences are measured at several points and the results are averaged so as to have the parallel displacement (sθx, sθy).

[Numerical Formula 4]

$$P_{\theta z}(i,j)=(i\cos\theta-j\sin\theta+S_{\theta x}-i, i\sin\theta+j\cos\theta+S_{\theta y}-j)$$

$$S_{\theta x}=p(1-\cos\theta)+q\sin\theta+S_x$$

$$S_{\theta y}=q(1-\cos\theta)-p\sin\theta+S_y \quad (4)$$

Whereas, when the registration deviation is clue to the parallel displacement and the projection magnification of each-color images, the registration deviation amount of each pixel $P_{zs}$ (i, j) can be obtained by the arithmetic processing of the following equation. In this case, first, the positions of green-color and red-color (blue-color) dots are measured at optional two points corresponding thereto so as to calculate the respective distances between the two points. From the proportion of the distances, the magnification between the green-color and red-color (blue-color) dots is calculated. The magnifications are measured at several points and the results are averaged so as to have the magnification m (mx, my). Then, the positions of the green-color and red-color dots are measured at optional points so as to calculate the coordinate Z (i, j) of the position where the coordinate of the red-color dot is enlarged/contracted at the magnification (mx, my), wherein Z (i, j)=(mxi, myj). Then, the difference between this coordinate and the coordinate of the green-color dot is calculated. The differences are measured at several points and the results are averaged so as to have the parallel displacement (szx, szy).

[Numerical Formula 5]

$$P_{zs}(i,j)=(mi+S_{zx}-i, mj+S_{xy}-j)$$

$$S_{zx}=(1-m)p+S_x$$

$$S_{zy}=(1-m)q+S_y \quad (5)$$

Specifically, a displacement calculating unit 31 calculates the registration deviation amount of each pixel every red- and blue-colors by the arithmetic processing of the following equation. In this case, first, the positions of green-color and red-color (blue-color) dots are measured at optional two points so as to calculate the angle defined by a straight line connecting the two dots of green color and a straight line connecting the two red dots. Furthermore, the respective distances between the two points are calculated and from the proportion of the distances, the magnification between the green-color and red-color (blue-color) dots is calculated. These are measured at several points and the results are averaged so as to have the rotational angle θ and the magnification m. Then, the positions of green-color and red-color (blue-color) dots are measured at optional two points so as to calculate the coordinate RZ (i, j) of the position where the coordinate of the red (blue)-color dot is enlarged/contracted at the magnification m after the red (blue)-color dot is rotated by the angle θ, wherein RZ (i, j)=(mi cos θ−mj sin θ, mi sin θ+mj cos θ). Furthermore, the difference between the coordinate of the red (blue)-color dot after the rotation and the coordinate of the green-color dot is calculated. These are measured at several points and the results are averaged so as to have the parallel displacement (sθzx, sθzy). The calculation order of the rotational registration-deviation amount and the projection magnification registration-deviation amount may be replaced.

[Numerical Formula 6]

$$P(i,j)=(mi \cos \theta - mj \sin \theta + S_{\theta xz} - i, \; mi \sin \theta + mj \cos \theta + S_{\theta yz} - j)$$

$$S_{\theta xz} = mp(1-\cos \theta) + mq \sin \theta + (1-m)p + S_x$$

$$S_{\theta yz} = mq(1-\cos \theta) - mp \sin \theta + (1-m)q + S_y \quad (6)$$

A brightness color-difference RGB converter 32 makes matrix operation on the brightness signal inputted from the signal input unit 15 and the video signal S1 due to the color difference signal so as to convert the video signal S1 into red, green, and blue color signals R, G, and B.

The blue-image processor 33B corrects the registration deviation of the blue-color signal B outputted from the brightness color-difference RGB converter 32 so as to be outputted.

Namely, in the blue-image processor 33B, a side-effect generating area detector 34 detects a specific change pattern, which changes in brightness on the screen 14 inherently in a display device and differently from other areas, from the blue-color signal B outputted by the brightness color-difference RGB converter 32. When the specific pattern is herein displayed inherently in the display device, the display device may not precisely express the gradation of each pixel. Specifically, when a liquid crystal display panel alternately repeats the high-level brightness display and the low-level brightness display in continuous pixels like in one-on/one-off signals, the gradation may not be precisely displayed due to the effect of the electric field of adjacent pixels. That is, in this case, the pixel, which should be essentially expressed at a high-brightness level, may be displayed at a lower gradation. In the liquid crystal display panel, such effect is designated as a discrete phenomenon. The side-effect generating area detector 34 detects such a specific pattern that locally changes in brightness level on the screen 14.

A panel γ correcting unit 35 takes a blue-color signal B outputted from the brightness color-difference RGB converter 32 so as to correct the signal level of the blue-color signal B so that the signal level becomes in proportion to the brightness level on the screen 14. More specifically, when γ of a corresponding transmission liquid crystal display panel 13B is to be γ1, the panel γ correcting unit 35 raises the signal level of the blue-color signal B to the γ1-th power so as to correct γ of the blue-color signal B to be approximately 1 and to establish the signal level of the blue-color signal B to be in proportion to the brightness level of the corresponding transmission liquid crystal display panel 13B for outputting the signal. This processing is executed by referring to a table at the signal level of the blue-color signal B, for example.

A device characteristic correcting unit 36 corrects the signal level of the blue-color signal B outputted from the panel γ correcting unit 35 in accordance with display characteristics of the corresponding transmission liquid crystal display panel 13B so that the signal level becomes more precisely in proportion to the brightness level on the screen 14. More specifically, the device characteristic correcting unit 36 corrects the signal level of the blue-color signal B in accordance with display characteristics of the corresponding transmission liquid crystal display panel 13B by referring to the display characteristic table from observed values stored in a memory (not shown) at the signal level of the blue-color signal B. In this case, since the panel γ correcting unit 35 corrects γ of the blue-color signal B in advance, the device characteristic correcting unit 36 corrects the deviation of the display characteristics the transmission liquid crystal display panel 13B after the γ correction, so that in the projector 11, the device characteristic correcting unit 36 may also execute the correction processing of the signal level by the panel γ correcting unit 35.

In this processing, the device characteristic correcting unit 33 corrects the signal level of the blue-color signal B with the signal level of the target observed pixel and the signal level of peripheral pixels by referring to the display characteristic table so as to reflect on changes in brightness level of the specific pattern detected by the side-effect generating area detector 34. In this case, a computation expression of evaluation values for evaluating the emission brightness changes of such a specific pattern may be prepared and the evaluation values may be calculated from values of the observed pixel and the peripheral pixel using the computation expression, so that the table may be referred using the evaluation values. By such a manner, the process for referring the table can be simplified. The evaluation values in this case may include the brightness level difference between the observed pixel and the peripheral pixel and the high-frequency component signal level difference between the observed pixel and the peripheral pixel.

A side-effect reaction processor 37 partially corrects the signal level of the blue-color signal B outputted from the device characteristic correcting unit 36 based on the detected results by the side-effect generating area detector 34 so that the signal level of the blue-color signal B of the specific pattern detected by the side-effect generating area detector 34 corresponds to the brightness level displayed in practice. More specifically, the side-effect reaction processor 37 divides the blue-color signal B into a high-frequency component and a low-frequency component so as to add them by weighting. By controlling the weighting factor in the weighted addition, in the area displaying the specific pattern detected by the side-effect generating area detector 34, the frequency characteristics of the blue-color signal B are switched from those not corrected to the characteristics with suppressed high-frequency area so that the signal level of the blue-color signal B corresponds to the brightness level displayed in practice. In stead of such weighted addition processing, the frequency characteristics of the blue-color signal B may also be corrected using an FIR (finite impulse response) filter in that the blue-color signal B is outputted via the FIR filter and the tap factor of the FIR filter is switched based on the detected results by the side-effect generating area detector 34.

The side-effect reaction processor 37 gradually executes the switching of the frequency characteristics of the blue-color signal B so as to prevent the deterioration in image quality due to the rapid change in characteristics. In this case, evaluation values for evaluating the specific pattern may also be differently calculated so as to control the strength of the frequency characteristics. More specifically, the high-frequency component may be extracted from the blue-color signal B with a high pass filter so as to incorporate the power of the high-frequency component in the evaluation values. Namely in this case, when the power of the high-frequency component is large, by increasing the attenuation factor or by reducing the cut-off frequency, the deterioration in image quality can be reduced to the utmost while the change of the balance in brightness and in color is being prevented. In this case, factors relevant to the strength of the discrete phenomenon, such as the brightness level and the dynamic range, may also be incorporated in the evaluation values.

With the side-effect reaction processor 37, the projector 11 removes the signal component generated due to the correction of the residual registration deviation, which has not been sufficiently corrected by the device characteristic correcting unit 36, from the blue-color signal B so as to change the balance in brightness and color for preventing the deterioration in image quality due to the registration deviation correcting. When the characteristics are sufficiently and practically ensured only with the device characteristic correcting unit 36, the side-effect generating area detector 34 and the side-effect reaction processor 37 may be omitted. Inversely, the device characteristic correcting unit 36 may be omitted when the characteristics are sufficiently and practically ensured with the side-effect generating area detector 34 and the side-effect reaction processor 37. However, when the blue-color signal B is corrected by the side-effect reaction processor 37, since the deterioration in resolving degree is accompanied, the characteristics of the blue-color signal B are corrected with the device characteristic correcting unit 36 and then, the residual registration deviation, which has not been sufficiently corrected, is corrected with the side-effect generating area detector 34 and the side-effect reaction processor 37 so as to prevent the deterioration in image quality to the minimum.

A registration deviation correcting unit 38 corrects each registration deviation amount P (i, j) B detected from a displacement calculating unit 31 by correcting the sampling point of the blue-color signal B so as to be outputted. The registration deviation correcting unit 38 executes the correction of the sampling point by the interpolation arithmetic processing so as to correct the registration deviation with the accuracy of one pixel or less. Namely, the registration deviation correcting unit 38 temporarily stores the blue-color signal B outputted from the side-effect reaction processor 37 in a memory so as to be held. The registration deviation correcting unit 38 also reads out the blue-color signal B of predetermined pixels in the periphery arranged about the center position, where reversely displaced by each registration deviation amount P (i, j) B, from the blue-color signal B stored in the memory so as to perform the interpolation arithmetic processing on the red-out blue-color signal B in accordance with the registration deviation amount P (i, j) B and to be outputted. The interpolation arithmetic processing may widely include 0-order hold, linear interpolation, cubic interpolation, and Lanczos interpolation.

A device characteristic return correcting unit 39 corrects the signal level of the blue-color signal B outputted from the registration deviation correcting unit 38 to be outputted with the characteristics inverse of the device characteristic correcting unit 36 and the side-effect reaction processor 37. A return γ correcting unit 40 corrects the signal level of the blue-color signal B outputted from the device characteristic return correcting unit 39 to be outputted with the characteristics inverse of the panel γ correcting unit 35. In this case, the blue-color signal B may also be outputted by correcting the gain and offset.

A red-image processor 33R is configured in the same way as in the blue-image processor 33B except for the difference of the target color signal so as to correct the registration deviation of a blue-color signal R outputted from the brightness color-difference RGB converter 32 and to be outputted.

A green-image processor 33G outputs a green-color signal G outputted from the brightness color-difference RGB converter 32 late by the time necessary for processing the red- and blue-color signals R and B in the red-image processor 33R and the blue-image processor 33B.

(2) Effects of Embodiment

In the projector 11 (FIG. 2) configured as described above, the video signal S1 drives the corresponding transmission liquid crystal display panels 13R, 13G, and 13B with the red, green, and blue-color signals R, G, and B after the image processor 16 adjusted registration so as to correct the registration deviation. Image beams LR, LG, and LB that have transmitted through the respective transmission liquid crystal display panels 13R, 13G, and 13B are projected on the screen 14. Thereby, the projector 11 can electrically adjust the registration with the image processor 16 so as to eliminate the conventional mechanical adjustment for simplification in comparison with the past.

In the image processor 16, in order to precisely lay the red and blue images of the video signal S1 (FIG. 1) on the green images thereof, the registration deviations of the red-color signal R and the blue-color signal 3 are corrected in the red-image processor 33R and the blue-image processor 33B, respectively. The green color is most perceived in image deterioration by a human in comparison with the red and blue colors. Whereas, the registration deviation is corrected by the interpolation arithmetic processing according to the embodiment, so that the deterioration in image quality may not be avoided in no small way. Hence, according to the embodiment, the registration deviations of the red-color signal R and the blue-color signal B are corrected so that the red and blue images are precisely laid on the green images, enabling the image deterioration to be avoided to the minimum. Moreover, the overall configuration can be simplified in comparison with the case where the registration deviations of the entire red-color signal R, the green-color signal G, and the blue-color signal B are corrected.

In each registration deviation correction, in the panel γ correcting unit 35, γ of the red-color signal R and γ of the blue-color signal B are corrected, so that the signal levels of the each-color signals R and B become in proportion to the brightness levels displayed by the transmission liquid crystal display panels 13R and 13B, respectively. Then, in the device characteristic correcting unit 36, the signal levels are corrected with display characteristics of the display devices 13R and 13B. Then, in the side-effect reaction processor 37, the signal levels of the each-color signals R and B are corrected so as to suppress changes in emission brightness on specific patterns inherent to the display devices 13R and 13B, respectively. Thereafter, in the registration deviation correcting unit 38, the registration deviation is corrected by the interpolation arithmetic processing with an accuracy of one pixel or less. Then, in the device characteristic return correcting unit 39 and the return γ correcting unit 40, the signal levels of the each-color signals R and B are corrected with characteristics inverse of the device characteristic correcting unit 36 and the panel γ correcting unit 35 for driving the transmission liquid crystal display panels 13R and 13B, respectively.

Thereby, the projector 11 can effectively avoid the changes of balances in brightness and color due to the registration adjustment for significantly preventing image degradation. Namely, by the interpolation arithmetic processing, the registration deviation can be corrected with good accuracy of one pixel or less; however, if each-color signals R, G, and B obtained by calculating the brightness signal and the color difference signal would be adjusted in registration by the direct interpolation arithmetic processing, the signal levels of the each-color signals R, G, and B are not in proportion to the brightness levels of each-color pixels, so that the balances in brightness and color should be changed.

However, according to the embodiment, after the signal levels of the color signals R and B are corrected with γ of the corresponding liquid crystal display panels 13R and 13B, the registration deviation is corrected; then, original γ is returned, so that such changes of the balances in brightness and color can be effectively avoided and the registration deviation can be corrected with a high accuracy of integer pixels or less, thereby significantly preventing the image degradation.

Not only with γ of the liquid crystal display panels 13R and 13B in such a manner, but also by correcting the signal levels of the color signals R and B so as to correspond to the display characteristics of the liquid crystal display panels 13R and 13B, respectively, the changes of the balances in brightness and color due to the discrete phenomenon generated when the registration deviation is corrected are reduced. Furthermore, in addition to the discrete phenomenon, the changes of the balances in brightness and color generated due to the display characteristics of the liquid crystal display panels 13R and 13B can be effectively avoided, thereby significantly preventing the image degradation so as to correct the registration deviation.

Also, the side-effect generating area detector 34 detects an area where the malfunction, such as the discrete phenomenon, is generated and the side-effect reaction processor 37 suppresses the high-frequency component in this area, so that the changes of the balances in brightness and color, due to the registration deviation correction generated even when the device characteristic correcting unit 36 corrects the signal levels of the color signals R and B, can be securely reduced effectively, thereby also significantly preventing the image degradation so as to correct the registration deviation.

In the practical registration-deviation correcting by the registration deviation correcting unit 38 (FIG. 3), the correction data DF is produced from the registration deviations of each part detected in the manufacturing process with the parallel-displacement registration deviation amount DXY correctable by the parallel displacement, the rotational registration-deviation amount. Dθ correctable by rotating the red- and blue-color images, and the projection-magnification registration-deviation amount DZ correctable by changing the projection-magnification of the red- and blue-color images. By the interpolation arithmetic processing by the displacement calculating unit 31 using the correction data DF, the parallel-displacement registration deviation amount relative to the green-color pixels PXY (i, j), the rotational registration-deviation amount Pθ (i, j), and the projection-magnification registration-deviation amount PZ (i, j) are calculated, so that by adding them together, the pixel registration deviation amount P (i, j) is calculated every the color signals R and B. By the interpolation arithmetic processing of a plurality of pixels arranged about the center position, where reversely displaced by the pixel registration deviation amount P (i, j), so as to correct the pixel registration deviation amount P (i, j), the registration deviations of the red-color signal R and the blue-color signal B are corrected.

Thereby, according to the embodiment, for the red-color signal R and the blue-color signal B, only the parallel-displacement registration deviation amount DXY, the rotational registration-deviation amount Dθ, and the projection-magnification registration-deviation amount DZ may be stored in the memory, so that the writing processing in the memory 17 is simplified in the manufacturing process and furthermore, the configuration of the memory 17 can be miniaturized.

In such a manner, the registration deviation amount is also detected every a registration-deviation generating factor so as to store it in the memory 17 so that the registration deviation amount is obtained by the interpolation arithmetic processing, thereby correcting the registration deviation every a generating factor with high accuracies. Namely, in the registration deviation amount due to the lateral chromatic aberration for example, with increasing distance from the optical axis, the correcting amount of the registration deviation can be smoothly increased, so that the registration deviation can be securely corrected with the smaller correction data DF without the sense of discomfort. Thereby, the configurations of the optical system to be projected on the screen can also be simplified.

(3) Effects of Embodiment

According to the configurations described above, after the signal level of the color signal is corrected so that the signal level becomes in proportion to the brightness level displayed on the screen, the registration deviation is corrected by the interpolation arithmetic processing, so that the image quality deterioration is reduced and the registration deviation can be more simply corrected with higher accuracies in comparison with the past.

More specifically, the signal level of the color signal is corrected with γ of the display device so that the signal level becomes in proportion to the brightness level displayed on the screen, thereby reducing the image quality deterioration and more simply correcting the registration deviation with higher accuracies in comparison with the past.

The signal level of the color signal is also corrected with the display characteristics of the display device so that the signal level becomes in proportion to the brightness level displayed on the screen, thereby reducing the image quality deterioration and more simply correcting the registration deviation with higher accuracies in comparison with the past.

A specific change pattern in that the brightness level changes differently from other parts on the display on the screen is detected so that the change in signal level due to the change pattern is suppressed on the basis of detected results, thereby effectively avoiding the changes of balances in brightness and color due to the discrete phenomenon generated by the registration deviation correction.

The registration deviations of the blue-color signal and the blue-color signal are corrected relative to the green-color signal, so that while the image quality degradation is being avoided to the minimum, the registration deviation can be corrected.

With the parallel-displacement registration deviation amount, the rotational registration-deviation amount, and the projection-magnification registration-deviation amount, the correction data is configured, so that the configurations of the memory for storing the correction data can be simplified.

Second Embodiment

A projector according to a second embodiment is configured in the same way as in the projector according to the first embodiment except for the difference the correction data DF. According to the second embodiment, registration deviation amounts actually measured in the horizontal and vertical directions every predetermined pixel are allocated to the correction data DF.

Thus, according to the embodiment, the displacement calculating unit 31 calculates the registration deviation amount of each pixel by the interpolation arithmetic processing according to the following equation. Wherein, (Cx(u, v), Cy(u, v)) denotes the registration deviation amount of the correction data DF at the point C(u, v). P(i, j) denotes the registration deviation amount of the pixel at the point (i, j).

[Numerical Formula 7]

$$P(i,j)=((1-p)*(1-q)*Cx(s,t)+p*(1-q)*Cx(s+1,t)+(1-p)*q*Cx(s,t+1)+p*q*Cx(s+1,t+1), (1-p)*(1-q)*Cy(s,t)+p*(1-q)*Cy(s+1,t)+(1-p)*q*Cy(s,t+1)+p*q*Cy(s+1,t+1))$$

$$s = i\, \text{div}\, D$$

$$t = j\, \text{div}\, D$$

$$p = (i \bmod D)/D$$

$$q = (j \bmod D)/D \qquad (7)$$

According to the second embodiment, when the correction data is composed of the registration deviation amounts detected every predetermined pixels of the color signal, the same effects can be obtained as those of the first embodiment.

Third Embodiment

In a projector according to a third embodiment, the green-image processor 33G is configured in the same way as in the red-image processor 33R and the blue-image processor 33B according to the first or second embodiment so as to correct also image distortion. Thus, in the projector according to the third embodiment, the displacement amount of the green-color pixel relative to a predetermined reference position is allocated to the correction data DF; the green-image processor 33G produces displacement correction data of each pixel so as to correct the displacement amount. Also, the red-image processor 33R and the blue-image processor 33B correct the registration deviation amount of each pixel obtained by the calculation with the displacement amount of the corresponding pixel obtained by the green-image processor 33G so as to perform the interpolation arithmetic processing on the corrected results.

When the distortion of a figure pattern is also corrected according to the third embodiment, the quality of images displayed on the screen can be further improved. In this case, in addition to the red-color signal and the blue-color signal, the green-color signal is processed in the panel γ correcting unit 35, the device characteristic correcting unit 36, and the side-effect reaction processor 37, so that the changes of balances in brightness and color can be further prevented.

Fourth Embodiment

In a projector according to a fourth embodiment, the correction data DF receives the renewal from user operation. The projector according to the fourth embodiment is configured in the same way as in the projector according to the first to third embodiments except for that the correction data. DF receives the renewal from user operation.

Namely, in the projector according to the fourth embodiment, an operation mode is switched to an adjustment mode according to the user operation so that the video signal S1 of a dot pattern is inputted and displayed. In the state of the displayed dot pattern, the correction data DF stored in a correcting memory receives the renewal according to the user operation. Thereby, the projector according to the fourth embodiment renews the correction data if necessary so as to correct the registration deviation due to ageing.

When the correction data DF receives the renewal according to the fourth embodiment, the registration deviation due to the ageing can also be corrected.

Fifth Embodiment

According to the embodiments described above, the processing in the side-effect reaction processor 37 is not returned to original characteristics; however, the invention is not limited thereto, so that after correcting the registration deviation, the processing may be returned to the original characteristics in the same way as in the panel γ correcting unit 35 and the device characteristic correcting unit 36.

According to the third embodiment described above, the green-image processor 33G is configured in the same way as in the red-image processor 33R and the blue-image processor 33B so as to also correct image distortion; however, the invention is not limited thereto, so that the green-image processor 33G may be provided with only the side-effect reaction processor 37; alternatively, the registration deviation relative to the predetermined position may be corrected for the entire color signals.

According to the embodiments described above, the three-panel rear projector has been incorporated; however, the invention is not limited thereto, so that various projectors may be widely applied in that image beams are produced with a multi-color display device so as to project them on the screen. In a front projector, since image frames of each-color beams are displayed on the screen, respectively, if the registration deviation is corrected, the image frames of each-color beams are displaced to each other by the correction amount and projected. Consequently, by the registration deviation, the displayed images are surrounded by colored image frames, so that image quality is extremely deteriorated. Then, when the embodiments of the present invention are applied to the front projector, after the registration deviation is corrected, the output of image data for each-color is limited so as to prevent the generation of such a colored image frame, so that image quality degradation can be prevented.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus for displaying color images on a screen by projecting each-color image beams modulated from illumination light of the corresponding color with a display device driven by a predetermined color signal, the display apparatus comprising:

a memory configured to store correction data exhibiting a registration deviation amount on the screen;

a displacement calculating unit configured to calculate the registration deviation amount every one pixel of at least one of the color signal based on the correction data stored in the memory;

a correcting unit configured to correct the signal level of the one-color signal so that the signal level becomes in proportion to a brightness level on the screen; and a registration deviation correcting unit configured to correct the registration deviation of the one-color signal every one pixel by interpolation arithmetic processing of the color signal corrected with the correcting unit based on the registration deviation amount calculated with the displacement calculating unit, wherein the display device of the corresponding color is driven by the color signal corrected with the registration deviation correcting unit.

2. The apparatus according to claim 1, further comprising a return correcting unit configured to correct the signal level of the color signal, which has been corrected with the registration deviation correcting unit, with the characteristics inverse of the correcting unit.

3. The apparatus according to claim 1, wherein the correcting unit corrects the signal level of the one-color signal with γ of the display device.

4. The apparatus according to claim 1, wherein the correcting unit corrects the signal level of the one-color signal with display characteristics of the display device.

5. The apparatus according to claim 1, further comprising:
specific pattern detecting means for detecting a specific change pattern in that the brightness level changes from the one-color signal differently from other parts on a display on the screen; and
a change pattern processor for suppressing the change in signal level due to the change pattern from the one-color signal to be corrected by the registration deviation correcting unit on the basis of results detected by the specific pattern detecting means.

6. The apparatus according to claim 1, wherein one of the predetermined color signals is at least the green-color signal, the displacement calculating unit calculates the registration deviation amounts of the other-color signals relative to the green-color signal, and the registration deviation correcting unit corrects the registration deviations of the other-color signals relative to the green-color signal.

7. The apparatus according to claim 1, wherein the correction data exhibits the parallel displacement registration deviation amount correctable by moving in parallel the images projected on the screen, the rotational registration deviation amount correctable by rotating the images projected on the screen, and/or the registration deviation amount correctable by changing the projection magnification of the images projected on the screen.

8. The apparatus according to claim 1, wherein the correction data exhibits the registration deviation amount detected every a predetermined pixel of the one-color signal.

9. The apparatus according to claim 1, further comprising:
a specific pattern detecting unit for detecting a specific change pattern in that the brightness level changes from the one-color signal differently from other parts on a display on the screen; and
a change pattern processor for suppressing the change in signal level due to the change pattern from the one-color signal to be corrected by the registration deviation correcting unit on the basis of results detected by the specific pattern detecting unit.

10. An adjustment method of a display apparatus for displaying color images on a screen by projecting each-color image beams modulated from illumination light of the corresponding color with a display device driven by a predetermined color signal, the adjustment method comprising the steps of:
displacement-calculating a registration deviation amount every one pixel of at least one of the color signal based on correction data stored in a memory;
correcting a signal level of the one-color signal so that the signal level becomes in proportion to a brightness level on the screen;
registration-deviation correcting the registration deviation of the one-color signal every one pixel by interpolation arithmetic processing of the color signal corrected by the correcting step based on the registration deviation amount calculated by the displacement-calculating step; and
driving the corresponding display device with the color signal corrected by the registration-deviation correcting step.

* * * * *